United States Patent
Jiang et al.

(10) Patent No.: US 9,836,338 B2
(45) Date of Patent: Dec. 5, 2017

(54) METHOD AND APPARATUS FOR MESSAGE INTERACTIVE PROCESSING

(71) Applicant: ZTE Corporation, Shenzhen (CN)

(72) Inventors: Haiming Jiang, Shenzhen (CN); Jiancheng Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 140 days.

(21) Appl. No.: 14/776,969

(22) PCT Filed: Mar. 5, 2014

(86) PCT No.: PCT/CN2014/072924
§ 371 (c)(1),
(2) Date: Dec. 22, 2015

(87) PCT Pub. No.: WO2014/139367
PCT Pub. Date: Sep. 18, 2014

(65) Prior Publication Data
US 2016/0103718 A1    Apr. 14, 2016

(30) Foreign Application Priority Data
Mar. 15, 2013    (CN) .......................... 2013 1 0082996

(51) Int. Cl.
*G06F 13/42* (2006.01)
*G06F 9/54* (2006.01)
(Continued)

(52) U.S. Cl.
CPC .............. *G06F 9/546* (2013.01); *G06F 9/544* (2013.01); *G06F 9/545* (2013.01);
(Continued)

(58) Field of Classification Search
None
See application file for complete search history.

(56) References Cited

U.S. PATENT DOCUMENTS

2008/0162859 A1* 7/2008 Christenson .......... G06F 9/5016
                                                          711/170
2008/0162860 A1* 7/2008 Sabbatini .............. G06F 13/385
                                                          711/170
(Continued)

FOREIGN PATENT DOCUMENTS

CN    101055533 A    10/2007
CN    101448018 A     6/2009
(Continued)

OTHER PUBLICATIONS

International Search Report for corresponding application PCT/CN2014/072924 filed Mar. 5, 2015; dated Jul. 9, 2014.
(Continued)

*Primary Examiner* — Elias Mamo
(74) *Attorney, Agent, or Firm* — Cantor Colburn LLP

(57) ABSTRACT

Provided are a message interaction processing method and device. The method includes: a first buffer with a preset size is applied for to a Central Processing Unit (CPU) and/or a chip; and message interaction is performed between the CPU and the chip through the first buffer, wherein the first buffer is used for storing at least two messages. By the disclosure, the problem that frequent switching between states may cause high resource overhead and low message transmission efficiency under the condition of large message interaction between the CPU and the chip is solved, and the effect of remarkably improving message sending and receiving efficiency and performance of network equipment is further achieved.

6 Claims, 7 Drawing Sheets

(51) Int. Cl.
*G06F 15/173* (2006.01)
*G06F 13/16* (2006.01)
*G06F 13/40* (2006.01)
*G06F 15/78* (2006.01)

(52) U.S. Cl.
CPC ...... *G06F 13/1673* (2013.01); *G06F 13/4068* (2013.01); *G06F 15/17306* (2013.01); *G06F 15/7825* (2013.01)

(56) References Cited

U.S. PATENT DOCUMENTS

| | | | |
|---|---|---|---|
| 2008/0313655 A1* | 12/2008 | Pope | G06F 9/45533 719/319 |
| 2011/0010723 A1* | 1/2011 | Okabe | G06F 9/545 719/312 |
| 2011/0321056 A1 | 12/2011 | Branson | |
| 2012/0239860 A1* | 9/2012 | Atkisson | G06F 12/0246 711/103 |
| 2013/0191548 A1* | 7/2013 | Boddukuri | H04L 49/358 709/231 |

FOREIGN PATENT DOCUMENTS

| | | |
|---|---|---|
| CN | 102135866 A | 7/2011 |
| CN | 103176855 A | 6/2013 |
| EP | 2463777 A1 | 6/2012 |

OTHER PUBLICATIONS

European Search Report for corresponding application EP14762273; Report dated Feb. 5, 2016.

Steven Mccanne, "The BSD Packet Filter:, A new Architecture for User-level Packet Capture", May 1, 2001, pp. 1-12, XP061012482.

Tim Jones, "Kernel Command Using Linux System Calls—Explore the ACI and Add Your Own Calls", Mar. 21, 2007, pp. 1-12, XP002634576.

* cited by examiner

METHOD AND APPARATUS FOR MESSAGE INTERACTIVE PROCESSING

TECHNICAL FIELD

The disclosure relates to the field of communication, and including a message interaction processing method and device.

BACKGROUND

In starting and running processes of network equipment, control layer software may frequently interact with a chip. For example, in an initialization process of the chip, a great number of registers may be configured by the chip; and for another example, in a running process of the chip, a user may issue many kinds of configurations and operate a great number of table entries of the chip. For the chip, the main operation is to read and write an internal or external memory and internal register of the chip. At present, many table entries of the network equipment and the configurations of the register are implemented by message interaction between the chip and a Central Processing Unit (CPU).

At present, a Linux operating system is widely applied to a network equipment driver, wherein the Linux operating system comprises two levels, i.e. a user-state level and a kernel-state level, FIG. 1 is a diagram of levels of equipment driver software of the Linux operating system in a related art, and as shown in FIG. 1, the following description is given by taking the CPU and the network chip as an example. The CPU includes two levels: a user-state level and a kernel-state level, which correspond to a user-state memory and a kernel-state memory respectively, and the CPU is connected with the network chip through a bus. FIG. 2 is a diagram of levels of ordinary message sending driver software in the related art, and as shown in FIG. 2, a method for sending a message by a network equipment driver usually includes: applying for a user-state memory for each message, filling the message into the user-state memory, switching to a kernel state by calling a write system, copying a content of the message into a kernel-state buffer area from the user-state memory, and finally writing the message into the chip. FIG. 3 is a diagram of levels of ordinary message receiving driver software in the related art, and as shown in FIG. 3, the message receiving flow includes: introducing a hardware interrupt due to message reporting, reading a message into a kernel buffer area from a chip by virtue of a kernel driver, then switching to a user state by calling a read system, and reading the message into a user-state memory from the kernel buffer area. Every time when a message is sent and received, user-state memory application and releasing operation may be introduced, one user state and kernel state switching is further introduced, and user state and kernel state switching overhead of the Linux operating system is very high.

The conventional methods are only applied to the condition of low message sending and receiving efficiency. If the throughput of message interaction between the CPU and the chip is relatively higher, the system may continuously apply for and release the memory and continuously perform user space and kernel space switching (or called user state and kernel state switching), which may cause a great burden of the CPU of network equipment and also reduce message transmission efficiency.

Therefore, frequent switching between states may cause the problems of high resource overhead and low message transmission efficiency under the condition of large message interaction between the CPU and the chip in the related art.

SUMMARY

A message interaction processing method and device are provided in the disclosure, so as to solve the problem that frequent switching between states may cause high resource overhead and low message transmission efficiency under the condition of large message interaction between the CPU and the chip in the related art.

According to one aspect of the disclosure, a message interaction processing method is provided, comprising: applying for a first buffer with a preset size to a Central Processing Unit (CPU) and/or a chip; and performing message interaction between the CPU and the chip through the first buffer, wherein the first buffer is used for storing at least two messages.

In an example embodiment, before or after performing the message interaction between the CPU and the chip through the first buffer, the method further comprises: applying for a second buffer with a same size as the first buffer to a user-state space and/or a kernel-state space of the CPU; and performing message interaction between the user-state space and the kernel-state space through the second buffer.

In an example embodiment, the message interaction is performed between the user-state space and the kernel-state space according to the second buffer in at least one of manners as follows: performing the message interaction between the user-state space and the kernel-state space through the second buffer according to a received control command for message interaction; and judging whether a total length of messages stored in a buffer reaches a preset threshold value or not, and when the total length is determined to reach the preset threshold value, performing the message interaction between the user-state space and the kernel-state space according to the second buffer.

In an example embodiment, after performing the message interaction between the CPU and the chip through the first buffer, the method further comprises: releasing the first buffer and/or a second buffer.

In an example embodiment, each message stored in the first buffer and/or a second buffer contains a message header, wherein the message header comprises information representative of a size of the corresponding message.

In an example embodiment, each buffer corresponds to one identifier, wherein the identifier is used for identifying a length of messages and the number of the messages in the buffer.

According to another aspect of the disclosure, a message interaction processing device is provided, comprising: a first applying component, configured to apply for a first buffer with a preset size to a Central Processing Unit (CPU) and/or a chip; and a first interacting component, configured to perform message interaction between the CPU and the chip through the first buffer, wherein the first buffer is used for storing at least two messages.

In an example embodiment, the device further comprises: a second applying component, configured to apply for a second buffer with a same size as the first buffer to a user-state space and/or a kernel-state space of the CPU; and a second interacting component, configured to perform message interaction between the user-state space and the kernel-state space through the second buffer.

In an example embodiment, the second interacting component is further configured to perform the message interaction between the user-state space and the kernel-state space according to the second buffer in at least one of manners as follows: the message interaction is performed between the user-state space and the kernel-state space through the second buffer according to a received control command for message interaction; and whether a total length of messages stored in a buffer reaches a preset threshold value or not is judged, and when the total length is determined to reach the preset threshold value, the message interaction is performed between the user-state space and the kernel-state space according to the second buffer.

In an example embodiment, the device further comprises: a releasing component, configured to release the first buffer and/or a second buffer.

According to the disclosure, the first buffer with the preset size is applied for to the CPU and/or the chip; and message interaction is performed between the CPU and the chip through the first buffer, wherein the first buffer is used for storing at least two messages, so that the problem that frequent switching between states may cause high resource overhead and low message transmission efficiency under the condition of large message interaction between the CPU and the chip in the related art is solved, and the effect of remarkably improving message sending and receiving efficiency and performance of network equipment is further achieved.

BRIEF DESCRIPTION OF THE DRAWINGS

The drawings described here are adopted to provide further understanding of the disclosure, and form a part of the disclosure. Schematic embodiments of the disclosure and description thereof are adopted to explain the disclosure and not intended to form improper limits to the disclosure. In the drawings.

DETAILED DESCRIPTION OF THE EMBODIMENTS

The disclosure is described below with reference to the drawings and embodiments in detail. It is important to note that the embodiments in the disclosure and characteristics in the embodiments can be combined under the condition of no conflicts.

Figure 1:
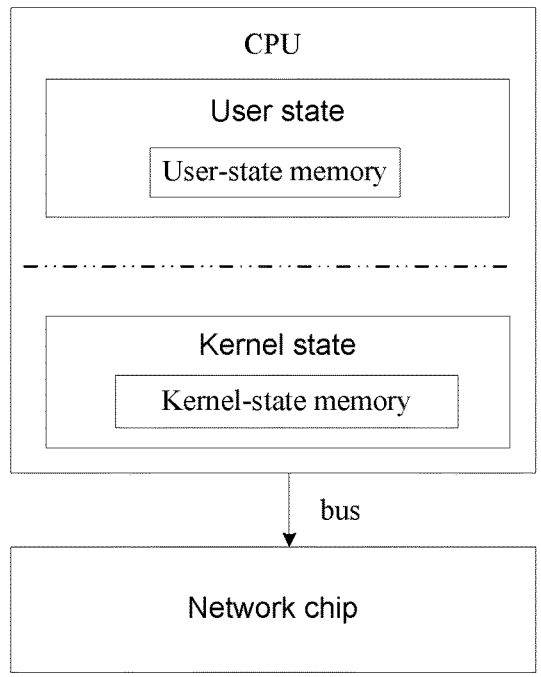
FIG. 1 is a diagram of levels of equipment driver software of a Linux system in the related technology.
Figure 2:
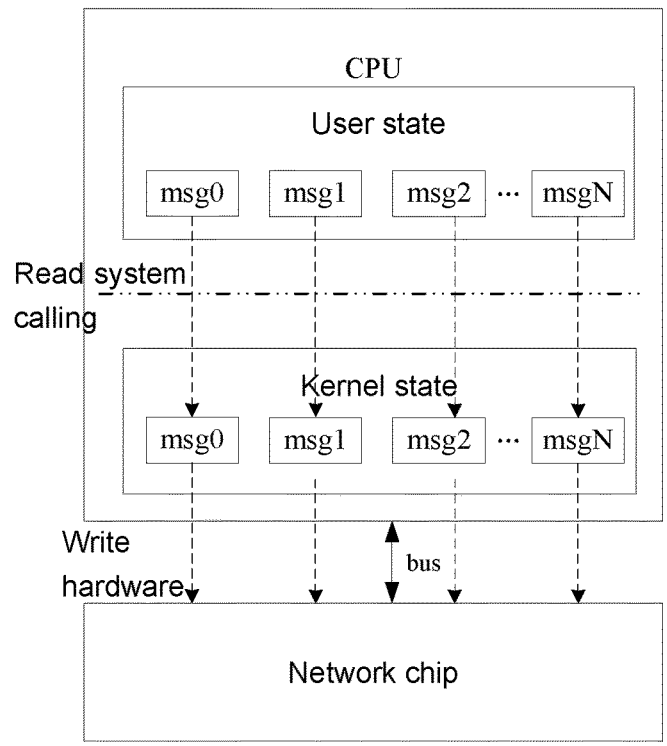
FIG. 2 is a diagram of levels of ordinary message sending driver software in the related technology.
Figure 3:
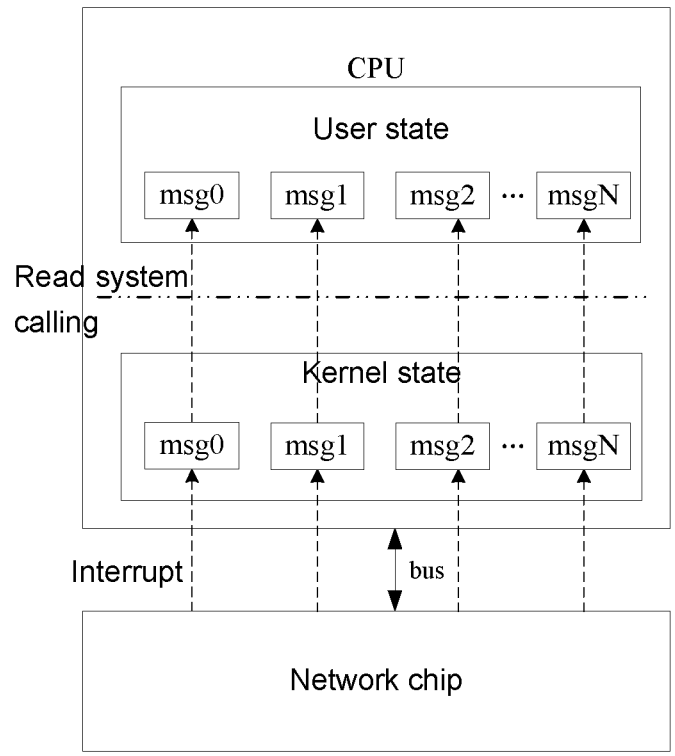
FIG. 3 is a diagram of levels of ordinary message receiving driver software in the related technology.
Figure 4:
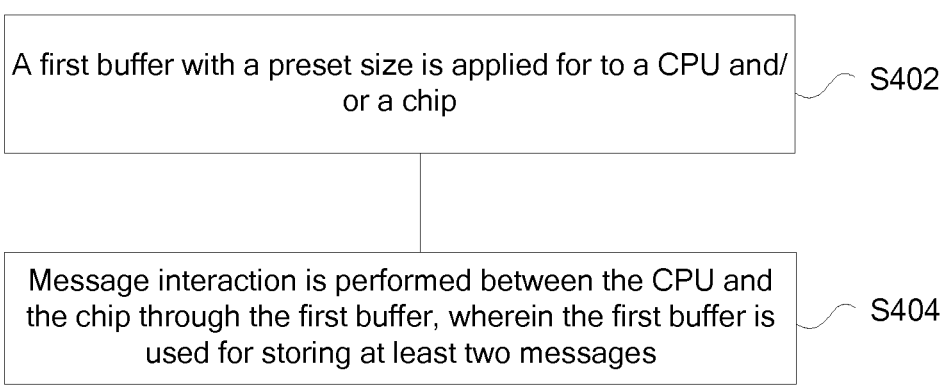
FIG. 4 is a flowchart of a message interaction processing method according to an embodiment of the disclosure.

A message interaction processing method is provided in the embodiment, FIG. 4 is a flowchart of a message interaction processing method according to an embodiment of the disclosure, and as shown in FIG. 4, the flow includes the following steps:

Step 402: a first buffer with a preset size is applied for to a CPU and/or a chip; and Step 404: message interaction is performed between the CPU and the chip through the first buffer, wherein the first buffer is used for storing at least two messages.

By the steps, message interaction is performed between the CPU and the chip through the first buffer used for storing at least two messages, and for the problems of high resource consumption, heavy system burden and low message transmission efficiency caused by the fact that a memory is required to be independently applied for and released for interaction (receiving and sending) of each message between the CPU and the chip and state switching is required by the interaction of each message in the related art, message interaction may be implemented by adopting the buffer capable of storing at least two messages, so that the problem that frequent switching between states may cause high resource overhead and low message transmission efficiency under the condition of large message interaction between the CPU and the chip in the related art is solved, and message sending and receiving efficiency and performance of network equipment are remarkably improved.

In an example embodiment, in order to further improve message sending and receiving efficiency, the abovementioned processing manner is also adopted for processing a message in the CPU, and first of all, a second buffer with a same size as the first buffer is applied for to a user-state space and/or a kernel-state space of the CPU; and message interaction is performed between the user-state space and the kernel-state space through to the second buffer. When the CPU sends a message to the chip, the above processing steps are finished before message interaction is performed between the CPU and the chip through the first buffer; and when the CPU receives a message from the chip, the above processing steps are finished after message interaction is performed between the CPU and the chip through the first buffer. It is important to note that when message interaction is performed between the user-state space and the kernel-state space through to the second buffer, multiple processing manners may be adopted, and for example, message interaction may be performed between the user-state space and the kernel-state space through the second buffer according to a received control command for message interaction; and for another example, whether a total length of messages stored in a buffer reaches a preset threshold value or not is judged at first, and when the total length is determined to reach the preset threshold value, the message interaction is performed between the user-state space and the kernel-state space through the second buffer.

In order to reuse resources or use the resources for other purposes, after the message interaction is performed between the CPU and the chip through the first buffer, the first buffer and/or the second buffer are/is released. In an example embodiment, each message stored in the first buffer and/or a second buffer contains a message header, wherein the message header includes information representative of a size of the corresponding message. Each buffer corresponds to one identifier, wherein the identifier is used for identifying a length of messages and the number of the messages in the buffer.

A message interaction processing device is further provided in the embodiment, the device is configured to implement the abovementioned embodiment and preferred implementation modes, and that what has been described will not be repeated. For example, a term "component", used below, is a combination of software and/or hardware capable of realizing preset functions. The device described in the following embodiment is preferably implemented by software, but the implementation of the device with hardware or the combination of software and hardware is also possible and conceivable.

Figure 5:
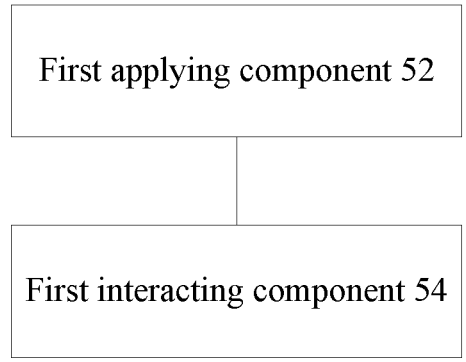
FIG. 5 is a structure diagram of a message interaction processing device according to an embodiment of the disclosure.

FIG. 5 is a structure diagram of a message interaction processing device according to an embodiment of the disclosure, and as shown in FIG. 5, the device includes a first applying component 52 and a first interacting component 54. The message interaction processing device is described below.

The first applying component 52 is configured to apply for a first buffer with a preset size to a CPU and/or a chip; and the first interacting component 54 is connected to the first applying component 52, and is configured to perform message interaction between the CPU and the chip through the first buffer, wherein the first buffer is used for storing at least two messages.

Figure 6A:
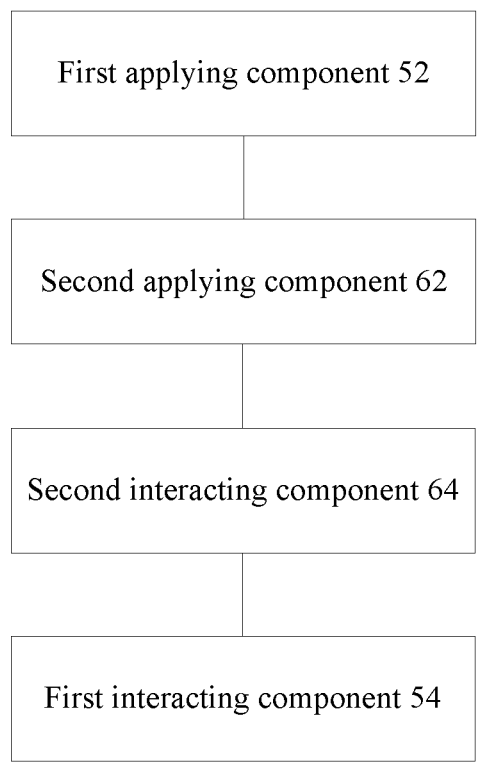
FIG. 6a is a first preferred structure diagram of a message interaction processing device according to an embodiment of the disclosure.

FIG. 6a is a first example structure diagram of a message interaction processing device according to an embodiment of the disclosure, and as shown in FIG. 6a, the device further includes, except all the components shown in FIG. 5, a second applying component 62 and a second interacting component 64. For a flow of sending a message to the chip by the CPU, a connecting manner of the example structure diagram is as follows:

the second applying component 62 is connected to the first applying component 52, and is configured to apply for a second buffer with a same size as the first buffer to a user-state space and/or a kernel-state space of the CPU; and the second interacting component 64 is connected to the second applying component 62 and the first interacting component 54, and is configured to perform message interaction between the user-state space and the kernel-state space through the second buffer.

Figure 6B:
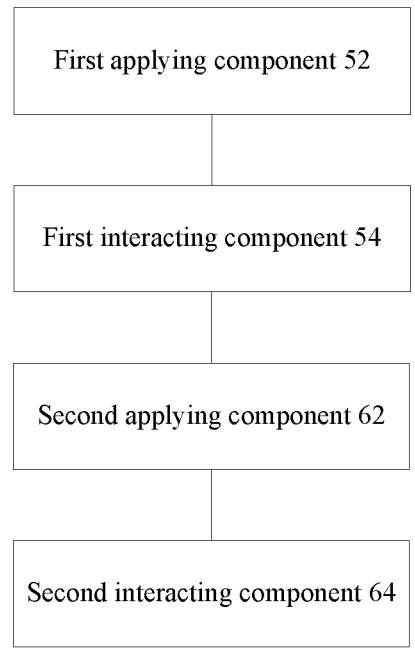
FIG. 6b is a second preferred structure diagram of a message interaction processing device according to an embodiment of the disclosure.

FIG. 6b is a second example structure diagram of a message interaction processing device according to an embodiment of the disclosure, and as shown in FIG. 6b, the example structure diagram includes components the same as those shown in FIG. 6a for a flow of receiving a message from the chip by the CPU, but a connecting relationship is differentiated as follows: the second applying component 62 is connected to the first interacting component 54; and the second interacting component 64 is connected to the second applying component 62.

In an example embodiment, the second interacting component 64 is further configured to perform message interaction between the user-state space and the kernel-state space through the second buffer in at least one of manners as follows: the message interaction is performed between the user-state space and the kernel-state space through the second buffer according to a received control command for message interaction; and whether a total length of messages stored in a buffer reaches a preset threshold value or not is judged, and when the total length is determined to reach the preset threshold value, the message interaction is performed between the user-state space and the kernel-state space through the second buffer.

Figure 7:
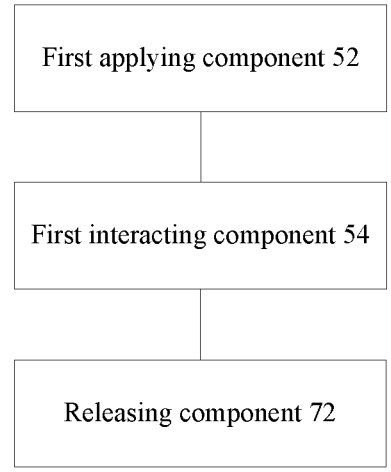
FIG. 7 is a third preferred structure diagram of a message interaction processing device according to an embodiment of the disclosure.

FIG. 7 is a third example structure diagram of a message interaction processing device according to an embodiment of the disclosure, and as shown in FIG. 7, the device further includes, except all the components shown in FIG. 5, a releasing component 72, configured to release the first buffer and/or a second buffer.

A method for sending and receiving a message is provided in the embodiment, wherein the method is applied to a network equipment driver in a Linux operating system. In the method, a chip driver is a character equipment driver, that is, the driver operates by taking the chip as a file, and a user-state driver and a kernel-state driver interact with each other through a file stream. The chip driver needs to initialize a file_operation structure for the chip, the structure including open, close, read, write, control (ioctl) and the like of character equipment.

Figure 8:
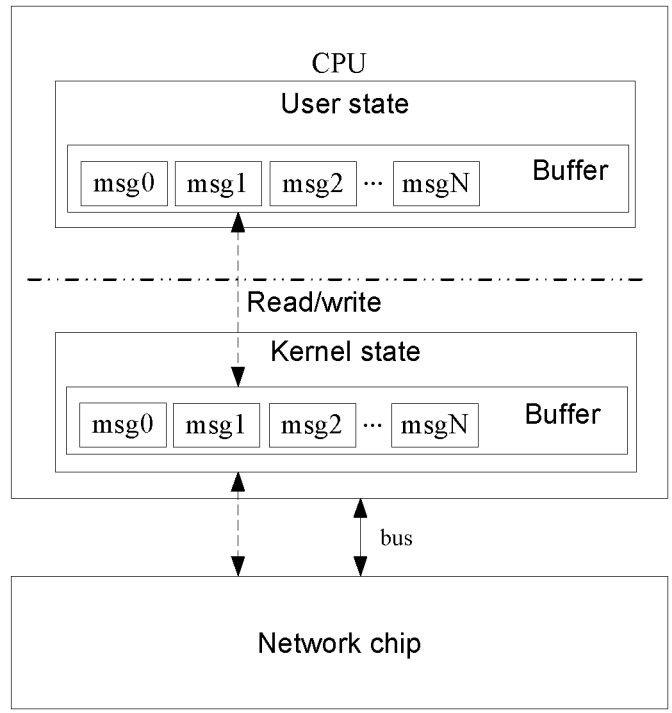
FIG. 8 is a diagram of levels of message packing sending and receiving software according to an embodiment of the disclosure.

In an example embodiment, the rapid method for sending and receiving a message provided by the embodiment may be implemented by calling a write system and a read system respectively. FIG. 8 is a diagram of levels of message packing sending and receiving software according to an embodiment of the disclosure, and as shown in FIG. 8, application and releasing of a memory in a user state and a kernel state are operated on the basis of a buffer with a fixed size in message sending and receiving processes. Specifically, when an average size of messages is 128 bytes, a buffer with the size of 64K may be applied for, that is, one buffer may store about 500 messages. In addition, a user space and a kernel state are switched on the basis of a buffer rather than each independent message in the message sending and receiving processes.

Figure 9:
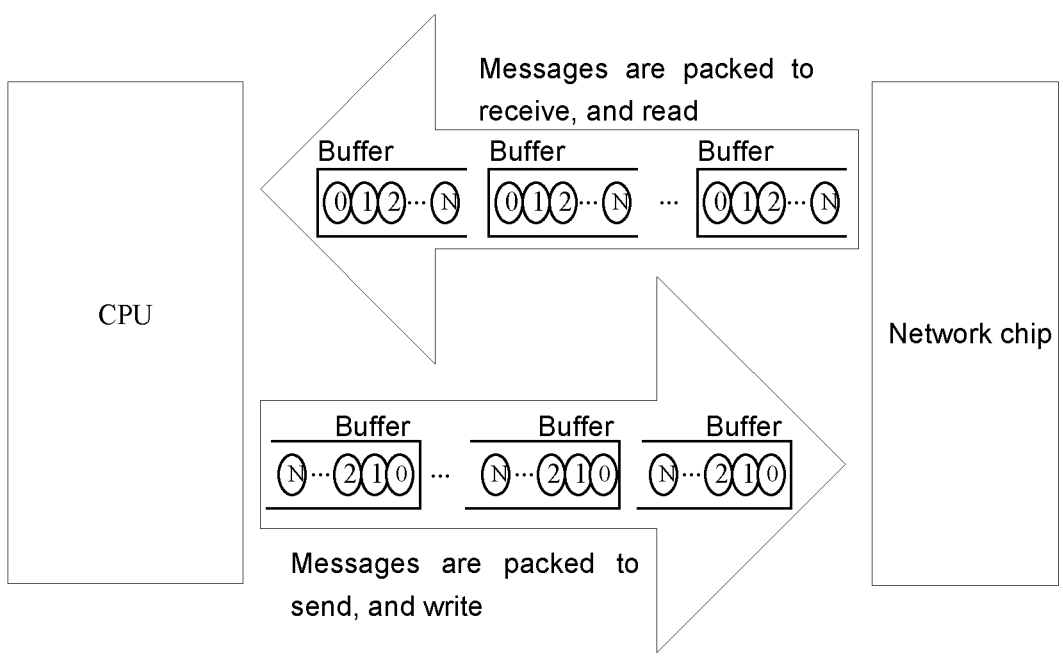
FIG. 9 is a diagram of message interaction between a chip and a CPU according to an embodiment of the disclosure.

FIG. 9 is a diagram of message interaction between a chip and a CPU according to an embodiment of the disclosure, and as shown in FIG. 9, messages in each buffer may be stored respectively in message sending and receiving processes; and there is a message header in front of each message, and represents the size of the message, so that the messages may be easily distinguished through the message headers. In the message sending and receiving processes, each buffer may also correspond to an identifier, and each identifier may be used for indentifying the length and the number of effective messages included in the buffer.

One user space and kernel space switching is introduced when message is packed to send, and a content in the buffer of the user space is copied into a buffer of a kernel space. The user space and the kernel space may be switched in two manners as follows: a user performs manual flush sending or the total size of messages in a user buffer reaches a threshold value. The threshold value is obtained by subtracting a maximum length of a single message from the size of the buffer.

Figure 10:
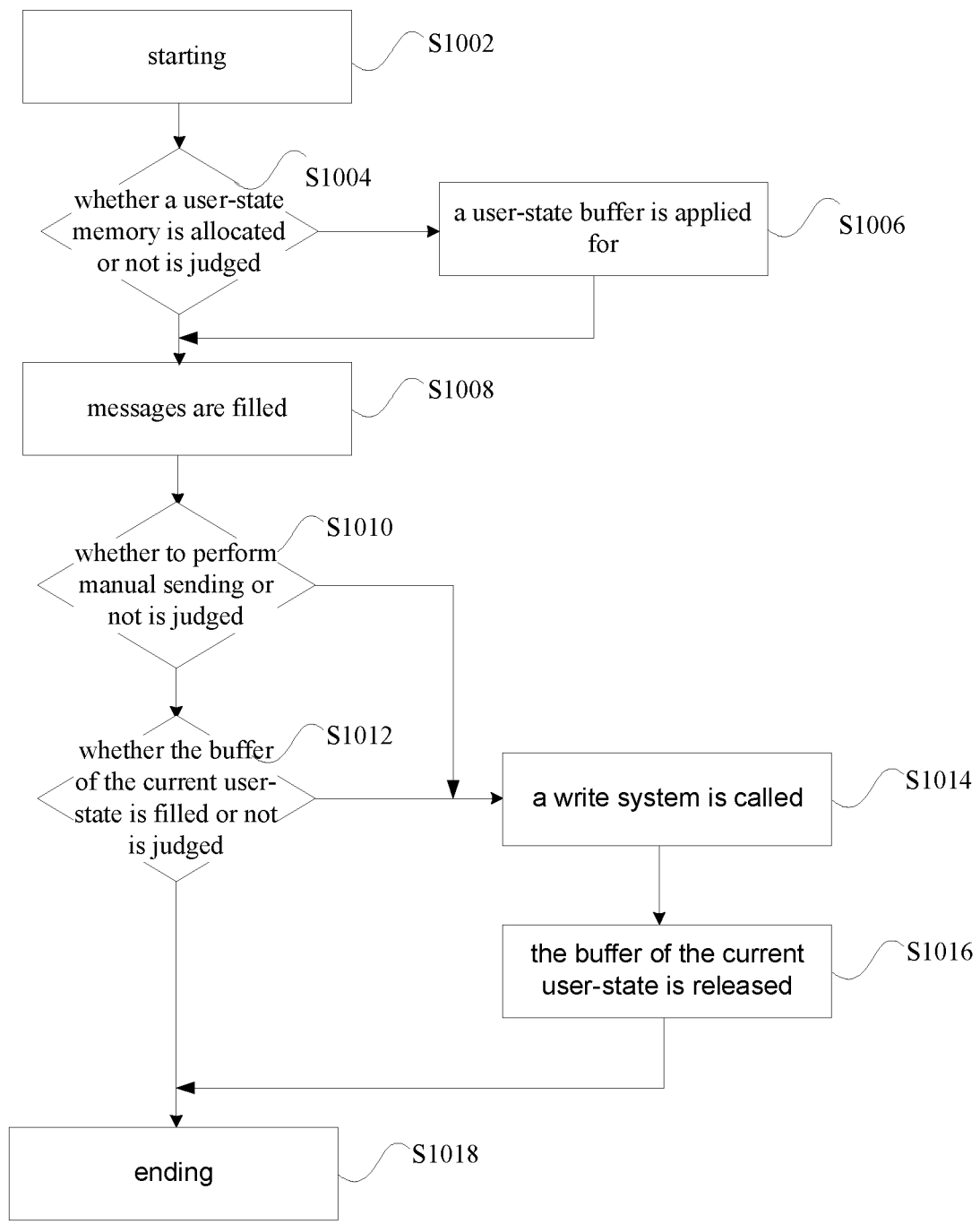
FIG. 10 is a flowchart of message packing sending according to an embodiment of the disclosure.

FIG. 10 is a flowchart of message packing sending according to an embodiment of the disclosure, and as shown in FIG. 10, the flow includes the following steps:

Step 1002: starting;

Step 1004: whether a user-state memory is allocated or not is judged, Step 1008 is executed when the user-state memory has been allocated, otherwise Step 1006 is executed;

Step 1006: a user-state buffer is applied for, wherein the buffer is used for storing messages;

Step 1008: messages are filled, wherein a total size buf_size of the current messages is recorded in a buffer descriptor, and a new message is filled to the tail of the current buffer (a message content is copied to a location with an offset of buf_size relative to the address of the buffer);

when each message is sent, a message header is added to the front of the message, wherein the message header includes the length of the message;

Step 1010: whether to perform manual sending (flush) or not is judged, Step 1014 is executed when it is determined to start flush sending, namely send the messages before the buffer is filled, otherwise Step 1012 is executed;

Step 1012: whether the current buffer is filled or not is judged, namely whether the threshold value is reached or not is judged, Step 1014 is executed when the size buf_size of the messages stored in the buffer reaches the threshold value, namely the buffer is filled, otherwise Step 1018 is executed;

Step 1014: a write system is called, and the messages is written into a chip, wherein a user space is switched into a kernel space, and the step may specifically include the following steps: a kernel-state buffer is applied for, wherein the size of the kernel-state buffer is the same as that of the user-state buffer; the contents of the message are copied into the kernel-state buffer from the user-state buffer, the messages is read from the buffer of the kernel-state, the messages is written into the chip one by one, and the kernel-state buffer is released;

Step 1016: the user-state buffer of the user-state is released, wherein the kernel space is switched into the user space, and the buffer of the current user-state is released; and Step 1018: ending.

Figure 11:
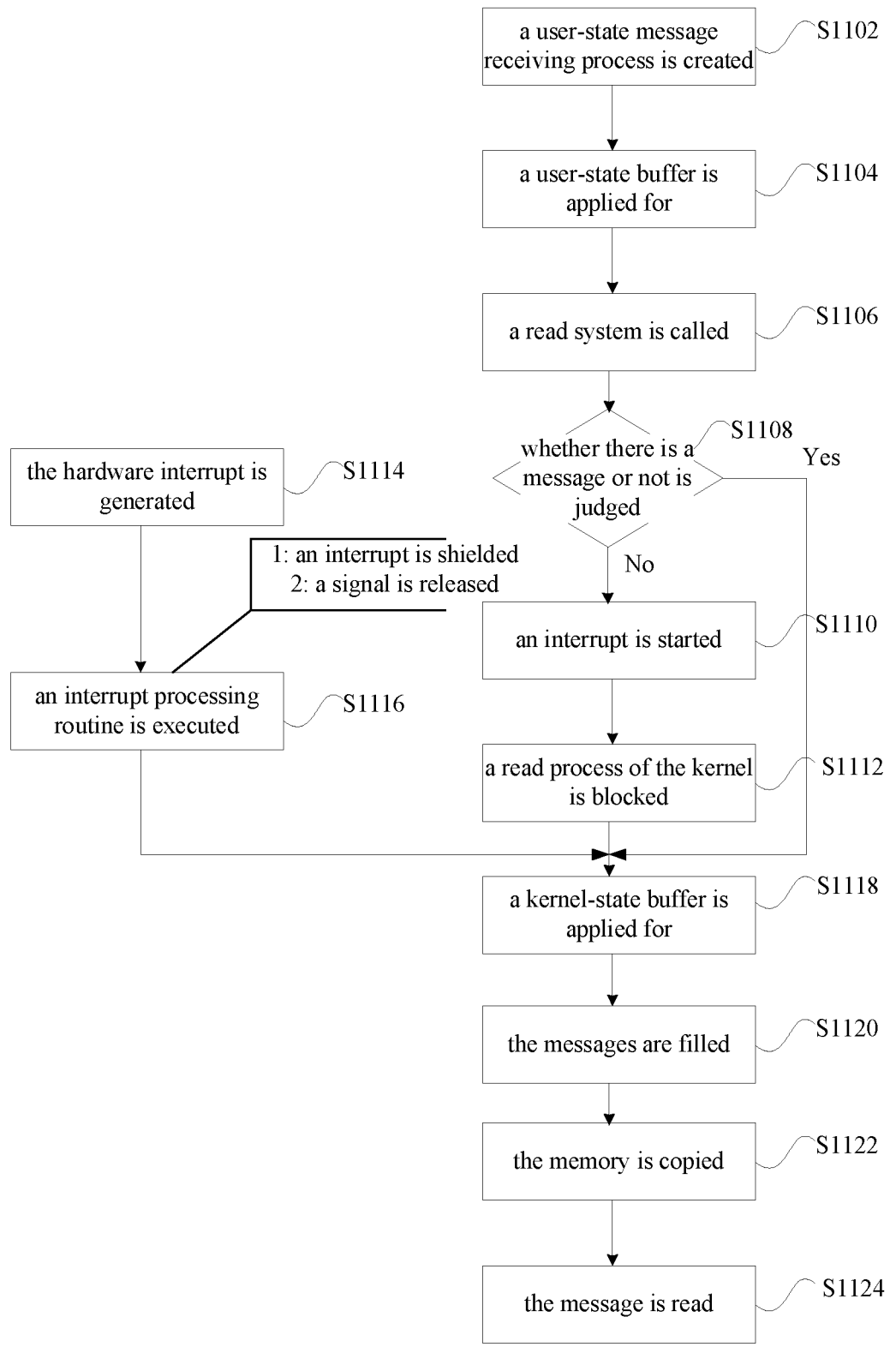
FIG. 11 is a flowchart of message packing receiving according to an embodiment of the disclosure.

FIG. 11 is a flowchart of message packing receiving according to an embodiment of the disclosure, and as shown in FIG. 11, the flow includes:

a message receiving flow, wherein it is necessary to create a receiving process in a user state and cyclically execute calling the read system, as shown in an elliptic frame in FIG. 11. Under the condition that there is no message reported, the read system calling is suspended by a signal in a kernel process; and under the condition that there is a message reported, a hardware interrupt is introduced, an interrupt processing routine is triggered by the interrupt, and the interrupt processing routine includes: operations of interrupting shielding and signal releasing are performed, a suspended kernel message reading process is awaken, and reading a message content is started. After message reading is finished, the content of the message is read into a user-state memory from a kernel-state memory, and the kernel-state memory is released. A user-state program is responsible for analyzing the content of the message in a buffer, and the user-state memory is released after reading.

The flowchart of message packing receiving shown in FIG. 11 includes the following steps:

Step 1102: a user-state message receiving process is created, wherein the process always exists in a running process of a chip;

Step 1104: a user-state buffer is applied for, wherein the size of the buffer is a preset fixed size;

Step 1106: a read system is called;

Step 1108: whether there is a message or not is judged, a user space is switched to a kernel space, a corresponding register of the chip is read to judge whether there are messages unread or not, Step 1118 is executed when there are messages unread, otherwise Step 1110 is executed;

Step 1110: an interrupt is started, wherein an interrupt shielding register of the chip is started, that is, the interrupt is not shielded;

Step 1112: a read process of the kernel is blocked, wherein the read process of the kernel is suspended to wait for the interrupt to release a signal;

Step 1114: the interrupt is generated, wherein the hardware interrupt is triggered when there are messages reported in the chip;

Step 1116: an interrupt processing routine is executed, wherein an interrupt processing program shields the interrupt (shields a message interrupt source), releases a signal, and the suspended read process is awaken (Step 1112);

Step 1118: a kernel-state buffer is applied for;

Step 1120: the messages are filled, wherein the messages are read from the chip one by one, message headers containing message lengths are added in the message, and the messages are stored in the kernel-state buffer respectively;

Step 1122: the memory is copied, wherein the messages are read into the user-state buffer from the kernel-state buffer after the messages of the chip are read or the kernel-state buffer is filled (a preset threshold value is reached), and the kernel-state buffer is released after copying; and Step 1124: the message is read, namely the kernel space is switched into the user space, the number of the messages is obtained from a buffer descriptor by a user-state program, contents of the messages are analyzed according to the message lengths in the message headers, the messages are read one by one, finally the user-state buffer is released, and Step 1104 is executed.

It is important to note that: (1) all the buffers are applied for according to the same size in the embodiment; (2) message receiving is a process, and the read system is called cyclically to read the messages (as shown in the elliptic frame in FIG. 11), so that the method skips back to Step 1104 after Step 1124; in addition, the interrupt (Step 1114) is an asynchronous event, and the interrupt may be generated only when the chip reports the messages; (3) the following two manners (that is, there exist two conditions) may be adopted for copying from the kernel-state buffer to the user-state buffer in the message receiving process: one is that all the messages are read and the other is that the total size of the messages exceeds the size of the buffer, wherein after memory copying is finished under the first condition, the interrupt shielding register is started to wait for the coming of the next interrupt; and under the second condition, the messages are continuously read, and the interrupt shielding register is started after all the messages are read.

By the abovementioned embodiments and the example implementation embodiment, the problem of low efficiency under the condition of large message interaction between the CPU and the chip in the Linux system is solved, and throughput of message interaction is greatly improved. First of all, a relatively larger buffer is applied by memory application, so that frequent single-message-based memory application and releasing operation is avoided, and system loss and memory fragments are reduced; and in addition, the user space and the kernel space are switched on the basis of buffers, so that huge overhead of switching between the user space and the kernel space in the Linux system is greatly reduced.

Obviously, those skilled in the art should know that each component or step of the disclosure may be implemented by a universal computing device, and the components or steps can be concentrated on a single computing device or distributed on a network formed by a plurality of computing devices, and may optionally be implemented by programmable codes executable for the computing devices, so that the components or steps may be stored in a storage device for execution with the computing devices, or the shown or described steps may be executed in a sequence different from the sequence here under a certain condition, or the components or steps may form each integrated circuit component, or multiple components or steps therein may form a single integrated circuit component for implementation. As a consequence, the disclosure is not limited to any specific hardware and software combination.

The above is only the preferred embodiment of the disclosure and not intended to limit the disclosure, and for those skilled in the art, the disclosure may have various modifications and variations. Any modifications, equivalent replacements, improvements and the like within the spirit and principle of the disclosure shall fall within the scope of protection of the disclosure.

INDUSTRIAL APPLICABILITY

As mentioned above, the message interaction processing method and device provided by the embodiment of the disclosure have beneficial effects as follows: the problem that frequent switching between states may cause high resource overhead and low message transmission efficiency under the condition of large message interaction between the CPU and the chip is solved, and the effect of remarkably improving message sending and receiving efficiency and performance of network equipment is further achieved.

What is claimed is:

1. A message interaction processing method, comprising:
    applying for a first buffer with a preset size to a Central Processing Unit (CPU) and/or a chip; and
    performing message interaction between the CPU and the chip through the first buffer, wherein the first buffer is used for storing at least two messages;
    wherein before or after performing the message interaction between the CPU and the chip through the first buffer, the method further comprises:
    applying for a second buffer with a same size as the first buffer to a user-state space and/or a kernel-state space of the CPU; and
    performing message interaction between the user-state space and the kernel-state space through the second buffer;
    wherein the message interaction is performed between the user-state space and the kernel-state space through the second buffer in at least one of manners as follows:
    performing the message interaction between the user-state space and the kernel-state space through the second buffer according to a received control command for message interaction; and
    judging whether a total length of messages stored in a buffer reaches a preset threshold value or not, and when the total length is determined to reach the preset threshold value, performing the message interaction between the user-state space and the kernel-state space through the second buffer.

2. The method according to claim 1, after performing the message interaction between the CPU and the chip through the first buffer, the method further comprises:
    releasing the first buffer and/or a second buffer.

3. The method according to claim 1, wherein each message stored in the first buffer and/or a second buffer contains a message header, wherein the message header comprises information representative of a size of the corresponding message.

4. The method according to claim 1, wherein each buffer corresponds to one identifier, wherein the identifier is used for identifying a length of messages and the number of the messages in the buffer.

5. A message interaction processing device, comprising a hardware processor and a memory, and the hardware processor is configured to execute program components stored in the memory, wherein the program components comprises:
    a first applying component, configured to apply for a first buffer with a preset size to a Central Processing Unit (CPU) and/or a chip; and
    a first interacting component, configured to perform message interaction between the CPU and the chip through the first buffer, wherein the first buffer is used for storing at least two messages;
    a second applying component, configured to apply for a second buffer with a same size as the first buffer to a user-state space and/or a kernel-state space of the CPU; and
    a second interacting component, configured to perform message interaction between the user-state space and the kernel-state space through the second buffer;
    wherein the second interacting component is further configured to perform the message interaction between the user-state space and the kernel-state space through the second buffer in at least one of manners as follows:
    the message interaction is performed between the user-state space and the kernel-state space through the second buffer according to a received control command for message interaction; and
    whether a total length of messages stored in a buffer reaches a preset threshold value or not is judged, and when the total length is determined to reach the preset threshold value, the message interaction is performed between the user-state space and the kernel-state space through the second buffer.

6. The device according to claim 5, the device further comprises:
    a releasing component, configured to release the first buffer and/or a second buffer.

* * * * *